(12) United States Patent
Nikonov et al.

(10) Patent No.: US 7,386,197 B2
(45) Date of Patent: *Jun. 10, 2008

(54) METHOD AND APPARATUS FOR WAFER LEVEL TESTING OF INTEGRATED OPTICAL WAVEGUIDE CIRCUITS

(75) Inventors: Dmitri E. Nikonov, San Jose, CA (US); Mark T. McCormack, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/994,021

(22) Filed: Nov. 19, 2004

(65) Prior Publication Data

US 2005/0100266 A1    May 12, 2005

Related U.S. Application Data

(63) Continuation of application No. 10/041,038, filed on Dec. 28, 2001, now Pat. No. 6,859,587.

(51) Int. Cl.
*G02B 6/12* (2006.01)

(52) U.S. Cl. .......................... 385/14; 385/45; 327/752

(58) Field of Classification Search ............ 385/48–52, 385/14; 324/752
See application file for complete search history.

(56) References Cited

U.S. PATENT DOCUMENTS

| | | | |
|---|---|---|---|
| 3,864,016 A | | 2/1975 | Dakss et al. |
| 3,912,363 A | | 10/1975 | Hammer |
| 3,938,895 A | * | 2/1976 | Bridger et al. ........... 356/141.3 |
| 4,097,118 A | * | 6/1978 | Hammer ....................... 385/30 |
| 4,243,297 A | * | 1/1981 | Elion ........................... 385/24 |
| 4,302,267 A | * | 11/1981 | Palmer et al. ............... 156/158 |
| 4,762,386 A | * | 8/1988 | Gordon et al. ................ 385/84 |
| 4,773,063 A | | 9/1988 | Hunsperger et al. |
| 5,185,760 A | * | 2/1993 | Du et al. ..................... 372/104 |
| 5,187,760 A | * | 2/1993 | Huber .......................... 385/37 |
| 5,222,170 A | * | 6/1993 | Bargar et al. ................. 385/88 |
| 5,321,714 A | | 6/1994 | Paoli |
| 5,355,429 A | * | 10/1994 | Lee et al. .................... 385/136 |
| 5,585,634 A | * | 12/1996 | Stevenson et al. ...... 250/339.11 |
| 5,631,571 A | * | 5/1997 | Spaziani et al. ............. 324/752 |
| 5,703,980 A | * | 12/1997 | MacElwee et al. ........... 385/49 |
| 5,892,870 A | * | 4/1999 | Fingler et al. ................ 385/59 |
| 6,028,435 A | * | 2/2000 | Nikawa ....................... 324/752 |
| 6,243,517 B1 | | 6/2001 | Deacon |
| 6,257,771 B1 | * | 7/2001 | Okayasu ....................... 385/89 |
| 6,330,388 B1 | | 12/2001 | Bendett et al. |
| 6,342,166 B1 | * | 1/2002 | Ide et al. ....................... 216/84 |
| 6,489,399 B1 | | 12/2002 | Chan et al. |
| 6,542,672 B2 | | 4/2003 | Jewell et al. |

(Continued)

FOREIGN PATENT DOCUMENTS

WO    PCT/US 02/39158    12/2002

*Primary Examiner*—Ellen E. Kim
(74) *Attorney, Agent, or Firm*—Blakely, Sokoloff, Taylor & Zafman LLP

(57) ABSTRACT

A method of testing a planar lightwave circuit is achieved by coupling an optical probe to the planar lightwave circuit. In one embodiment, a second probe is used in combination with the first probe to test the planar lightwave circuit by sending and receiving a light beam through the planar lightwave circuit.

1 Claim, 2 Drawing Sheets

U.S. PATENT DOCUMENTS

| | | | |
|---|---|---|---|
| 6,628,860 B1 * | 9/2003 | Van Doorn | 385/31 |
| 6,684,015 B2 | 1/2004 | Johannessen | |
| 6,760,500 B2 * | 7/2004 | Furuyama | 385/14 |
| 6,859,587 B2 * | 2/2005 | Nikonov et al. | 385/49 |
| 2002/0063568 A1 * | 5/2002 | Hung | 324/753 |
| 2002/0164129 A1 * | 11/2002 | Jackson | 385/52 |
| 2003/0020903 A1 * | 1/2003 | Healy et al. | 356/138 |

* cited by examiner

METHOD AND APPARATUS FOR WAFER LEVEL TESTING OF INTEGRATED OPTICAL WAVEGUIDE CIRCUITS

This application is continuation of Ser. No. 10/041,038 filed Dec. 28, 2001, is now U.S. Pat. No. 6,859,587.

BACKGROUND OF THE INVENTION

1. Field of the Invention

The described invention relates to the field of optical circuits. In particular, the invention relates to an optical probe for testing an optical circuit.

2. Description of Related Art

Optical circuits include, but are not limited to, light sources, detectors and/or waveguides that provide such functions as splitting, coupling, combining, multiplexing, demultiplexing, and switching. Planar lightwave circuits (PLCs) are optical circuits that are manufactured and operate in the plane of a wafer. PLC technology is advantageous because it can be used to form many different types of optical devices, such as array waveguide grating (AWG) filters, optical add/drop (de)multiplexers, optical switches, monolithic, as well as hybrid opto-electronic integrated devices. Such devices formed with optical fibers would typically be much larger or would not be feasible at all. Further, PLC structures may be mass produced on a silicon wafer.

FIG. 1 is a schematic diagram that shows an example of the current way that planar waveguides 20, 22 are tested. Typically, a PLC wafer is diced and optical fibers, 10, 12 are mounted to the edge of a PLC die. Light is sent in to the PLC structure 5 through one optical fiber 10, and a second optical fiber 12 is used to detect the light. A photodetector coupled to the second optical probe 12 will detect the power of light transmitted to it.

If the PLC works properly, then fibers are permanently attached to the PLC, and the PLC is put into a package. However, if the PLC does not work properly, the unit is discarded, and the time and effort to dice, fiber mount and to comprehensively test the device are wasted. Thus, a method of testing a planar lightwave circuit at the wafer level or before fiber attach is important.

DETAILED DESCRIPTION

A method of testing a planar lightwave circuit is achieved by coupling an optical probe to the planar lightwave circuit. In one embodiment, a second optical probe is used in combination with the first optical probe to test the planar lightwave circuit by sending and receiving a light beam through the planar lightwave circuit.

Figure 1:
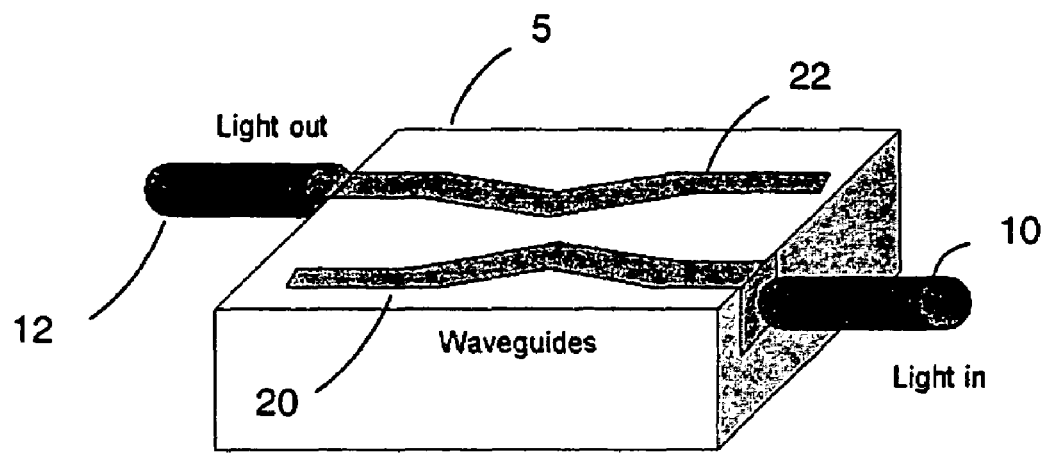
FIG. 1 is a schematic diagram that shows an example of the current way that planar waveguides are tested.
Figure 2:
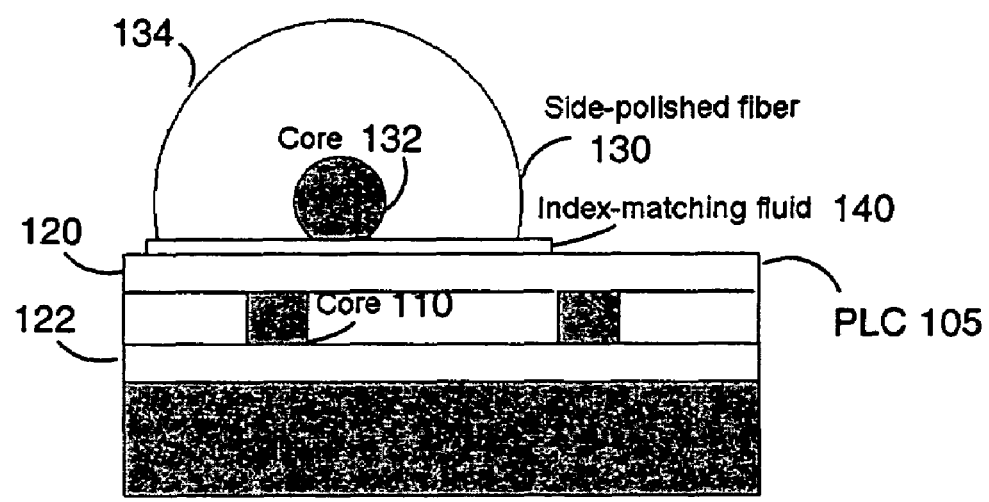
FIG. 2 is a cross-sectional schematic diagram of an optical probe used to test a planar lightwave circuit (PLC).

FIG. 2 is a cross-sectional schematic diagram of an optical probe 130 used to test a planar lightwave circuit (PLC) 105. The PLC 105 comprises a waveguide having a core layer 110, an upper cladding 120, and a lower cladding 122. In one embodiment, the upper cladding 120 is only partially applied at the time that the optical probe 130 is used to test the PLC 105, and one or more additional layers of upper cladding are subsequently applied to the PLC 105 after removing the optical probe. In one embodiment, an upper cladding layer of approximately 1-2 microns provides good optical coupling.

The optical probe 130 is an optical fiber comprising a core 132 and an outer cladding 134. The optical fiber 130 has been side-polished so that the core 132 is exposed. The side-polished optical fiber 130 is coupled to the waveguide core 110. In one embodiment, an index-matching fluid 140 is used to improve the optical coupling between the optical probe 130 and the waveguide core 110.

Figure 3:
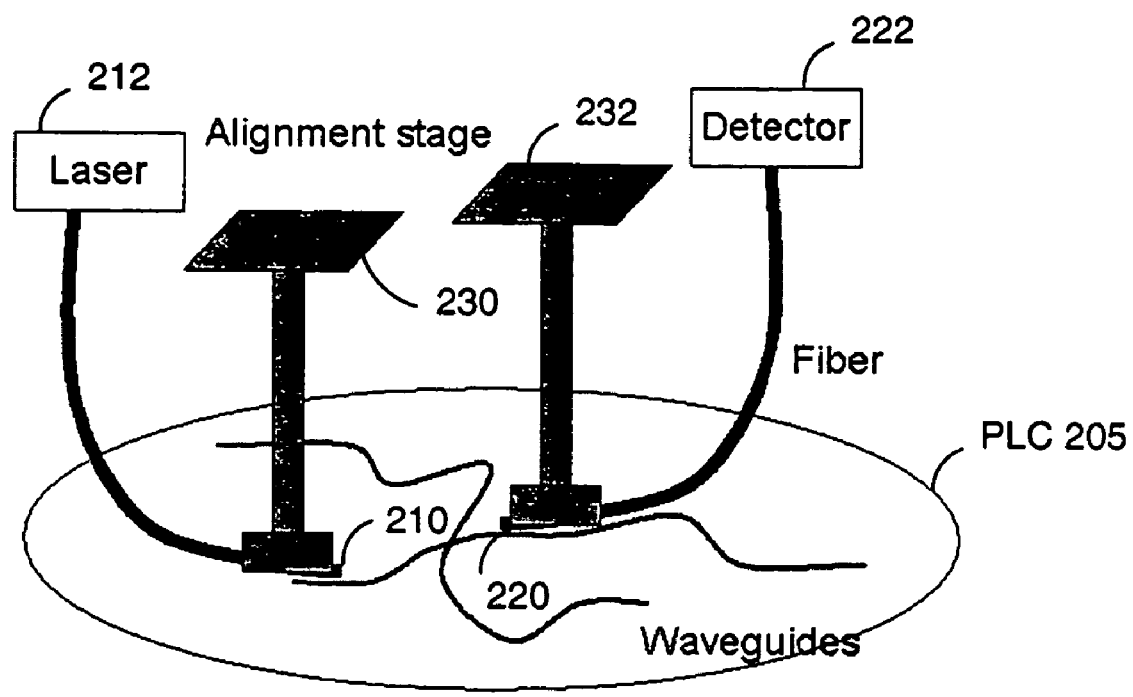
FIG. 3 is a 3-dimensional view illustrating one embodiment for testing a PLC wafer using two optical probes.

FIG. 3 is a 3-dimensional view illustrating one embodiment for testing a PLC wafer 205 using two optical probes 210, 220. PLC wafer 205 may include several PLC dice. In one embodiment, the testing is done before dicing the wafer or fiber interfacing the dice. A first optical probe 210 is coupled to a first portion of a waveguide of the PLC 205. The first optical probe 210 is coupled, e.g., with an optical fiber, to a light source 212 such as a laser. The light source 212 provides a light beam to the first optical probe 210, which is evanescently coupled to a first portion of the PLC 205.

A second optical probe 220 is coupled to a second portion of the PLC 205, and the second optical probe 220 is also coupled to a photodetector 222. Light transmission between the first portion of the PLC and the second portion of the PLC can now be tested. When the first optical probe 210 couples a light beam into the PLC 205, the light beam is detected through the second optical probe by the photodetector 222, if the PLC 205 is working properly.

An alignment stage 230 is used to position the first optical probe 210, and an alignment stage 232 is used to position the second optical probe 220. In one embodiment, each alignment stage 230, 232 provides six degrees of freedom. Thus, the optical probes are able to be aligned with the PLC 205 by modifying, for example, the X, Y, and Z coordinates, as well as pitch, yaw, and roll.

As previously mentioned, after functionality of the PLC 205 has been established, an additional layer of upper cladding may then be added to the top surface of the PLC 205.

In addition to the testing methods previously mentioned, this technology can be used for fault isolation or intermediate device debugging capabilities. It can be applied to a whole wafer as well as previously diced and possibly fiber interfaced PLCs if they are found non-optimal in performance. One or more probes with detection and/or transmission capability may be coupled at intermediate positions within the PLC (which would be inaccessible by conventional methods) to measure characteristics of PLC subunits and hence determine the local cause of observed effects for debug, fault isolation, and performance enhancement purposes.

Thus, a method and apparatus for testing a planar lightwave circuit is disclosed. However, the specific embodiments and methods described herein are merely illustrative. Numerous modifications in form and detail may be made without departing from the scope of the invention as claimed below. The invention is limited only by the scope of the appended claims.

What is claimed is:

1. A method of testing a planar lightwave circuit comprising:
   coupling a first optical probe having a side-polished optical fiber to the planar lightwave circuit;
   testing an optical pathway within the planar lightwave circuit by transmitting or receiving light through the first optical probe; and
   adding an additional layer of upper cladding to the planar lightwave circuit after removing the first optical probe.

* * * * *